(12) United States Patent
He et al.

(10) Patent No.: US 12,469,917 B2
(45) Date of Patent: Nov. 11, 2025

(54) BATTERY QUICK DISCONNECT ASSEMBLY, MOBILE CHASSIS, AND ROBOT

(71) Applicant: SHENZHEN PUDU TECHNOLOGY CO., LTD., Guangdong (CN)

(72) Inventors: Yuan He, Guangdong (CN); Tao Zhang, Guangdong (CN); Yuanzhi Wang, Guangdong (CN)

(73) Assignee: SHENZHEN PUDU TECHNOLOGY CO., LTD., Guangdong (CN)

( * ) Notice: Subject to any disclaimer, the term of this patent is extended or adjusted under 35 U.S.C. 154(b) by 422 days.

(21) Appl. No.: 17/928,722

(22) PCT Filed: Feb. 23, 2021

(86) PCT No.: PCT/CN2021/077416
§ 371 (c)(1),
(2) Date: Nov. 30, 2022

(87) PCT Pub. No.: WO2021/244069
PCT Pub. Date: Dec. 9, 2021

(65) Prior Publication Data
US 2023/0327295 A1    Oct. 12, 2023

(30) Foreign Application Priority Data

May 30, 2020   (CN) .......................... 202020965659.1

(51) Int. Cl.
*H01M 50/247*   (2021.01)
*A47L 11/40*    (2006.01)
(Continued)

(52) U.S. Cl.
CPC ....... *H01M 50/247* (2021.01); *A47L 11/4005* (2013.01); *H01M 50/256* (2021.01);
(Continued)

(58) Field of Classification Search
None
See application file for complete search history.

(56) References Cited

U.S. PATENT DOCUMENTS

| | | | |
|---|---|---|---|
| 2004/0006422 A1* | 1/2004 | Fehr | G01C 21/20 180/907 |
| 2010/0136425 A1 | 6/2010 | Gau et al. | |

(Continued)

FOREIGN PATENT DOCUMENTS

| | | | |
|---|---|---|---|
| CN | 206098504 U | * | 4/2017 |
| CN | 109473585 | | 3/2019 |

(Continued)

OTHER PUBLICATIONS

Machine Translation of JP-2017196294-A (Year: 2017).*

(Continued)

*Primary Examiner* — Gregg Cantelmo
(74) *Attorney, Agent, or Firm* — Dority & Manning, PA (57) ABSTRACT

A battery quick disconnect assembly, comprising: an accommodating portion which comprises an accommodating cavity, a hardware male interface being provided in the accommodating cavity, the accommodating cavity having an opening, the opening being formed at the proximal end of the accommodating cavity, and a snapping slot being provided at the vicinity of the opening; and a battery assembly which comprises a battery body, the battery body being provided with a hardware female interface and a rotating portion, the rotating portion being provided at the proximal end of the battery body, the rotating portion comprising two rotating pairs, a connecting member for connecting the two rotating pairs, and hooks, one hook being provided close to each rotating pair, and the two rotating pairs being respectively provided on the two sides of the battery body, so that
(Continued)

the battery assembly and the accommodating portion can be quickly connected and disconnected.

16 Claims, 5 Drawing Sheets

(51) Int. Cl.
    *H01M 50/256*     (2021.01)
    *H01M 50/262*     (2021.01)
    *H01M 50/296*     (2021.01)

(52) U.S. Cl.
    CPC ....... *H01M 50/262* (2021.01); *H01M 50/296* (2021.01); *H01M 2220/20* (2013.01)

(56) References Cited

U.S. PATENT DOCUMENTS

| | | | |
|---|---|---|---|
| 2013/0029199 A1 | 1/2013 | Andersen | |
| 2013/0183561 A1* | 7/2013 | Laitinen | H01M 50/227 |
| | | | 429/100 |
| 2017/0266069 A1* | 9/2017 | Lozano | A61G 5/04 |

FOREIGN PATENT DOCUMENTS

| | | | | |
|---|---|---|---|---|
| CN | 209045620 | | 6/2019 | |
| CN | 111067422 | | 4/2020 | |
| CN | 210443593 | | 5/2020 | |
| CN | 211125733 | | 7/2020 | |
| CN | 212497734 | | 2/2021 | |
| JP | 2000123806 A | * | 4/2000 | |
| JP | 2006172782 A | * | 6/2006 | |
| JP | 2007123179 | | 5/2007 | |
| JP | 2012009277 A | * | 1/2012 | |
| JP | 2012216346 A | * | 11/2012 | |
| JP | 2017196294 A | * | 11/2017 | |
| WO | WO-2020067395 A1 | * | 4/2020 | ......... H01M 50/543 |

OTHER PUBLICATIONS

Espacenet—Bibliographic data WO 2020067395A1 (Year: 2020).*
Machine Translation of JP-2012009277-A (Year: 2012).*
Machine Translation of JP-2000123806-A (Year: 2000).*
Machine Translation of CN-206098504-U (Year: 2017).*
Abstract of JP-2006172782-A (Year: 2006).*
PCT International Search Report and Written Opinion (w/ English translation) for corresponding PCT Application No. PCT/CN2021/077416, mailed on May 14, 2021, 17 pages.

* cited by examiner

BATTERY QUICK DISCONNECT ASSEMBLY, MOBILE CHASSIS, AND ROBOT

CROSS-REFERENCE TO RELATED APPLICATIONS

This application is a US national phase application of International patent application No. PCT/CN2021/077416 filed on Feb. 23, 2021, which, in turn, claims priority benefit of Chinese patent application No. 202020965659.1 filed on May 30, 2020, entitled "BATTERY QUICK DISCONNECT ASSEMBLY, MOBILE CHASSIS, AND ROBOT", the entire contents of both disclosures are incorporated herein for all purposes.

TECHNICAL FIELD

The present disclosure relates to a technical field of robots, in particular to a battery quick disconnect assembly, a mobile chassis, and a robot.

BACKGROUND

Mobile robots have been widely used in many fields, such as providing distribution services in restaurants, office buildings and hotels. The mobile robot usually have a chassis, the chassis drives the robot to move. The chassis is provided with batteries. Therefore, a battery assembly is an important part of the mobile robot, and it is also a power source. In actual use, the battery needs to be maintained, including operations such as disassembly and replacement. However, the existing chassis structure is not convenient to disassemble the battery, resulting in difficult maintenance.

SUMMARY

The present disclosure is made in view of the above-mentioned existing situation, and it aims to provide a battery quick disconnect assembly, a mobile chassis and a robot, which can realize the quick disassembly of the battery and facilitate maintenance.

In order to achieve the above purpose, the embodiments of the present disclosure provide the following technical solutions:

The present disclosure provides a battery quick disconnect assembly, including:

an accommodating portion including an accommodating cavity, wherein a hardware male interface is provided inside the accommodating cavity, the accommodating cavity has an opening provided at a proximal end of the accommodating cavity, a snapping slot is provided adjacent to the opening; and a battery assembly including a battery body, wherein the battery body is provided with a hardware female interface and a rotating portion, the rotating portion is disposed at a proximal end of the battery body, the rotating portion includes two rotating pairs, a connecting member connecting the two rotating pairs, and hooks, each hook is disposed adjacent to one of the two rotating pairs, the two rotating pairs are respectively disposed on both sides of the battery body;

wherein the battery assembly is detachably placed in the accommodating cavity, and when the battery assembly is disposed in the accommodating cavity, the hardware female interface is electrically connected to the hardware male interface, the hook is received in the slot, when the connecting member is rotated, the hook abuts against an inner wall of the slot and enables the battery assembly to move along a direction of being pulled away from the accommodating cavity.

Wherein, the hardware male interface is disposed at a distal end of the accommodating cavity, the hardware female interface is disposed at a distal end of the battery body, when the distal end of the battery body abuts against the distal end of the accommodating cavity, the battery assembly is located in the accommodating cavity, and the hardware male interface is electrically connected to the hardware female interface.

Wherein, a guiding groove is provided around the hardware male interface, a guiding blocking wall is provided around the hardware female interface, the guiding blocking wall extends into the guiding groove, so as to electrically connect the hardware male interface to the hardware female interface.

Wherein, an inner wall of the snapping slot includes a first wall, an arc-shaped wall, and a second wall, the first wall is parallel to the second wall, the arc-shaped wall connects to the first wall and the second wall, the second wall is disposed away from the accommodating cavity relative to the first wall, the hook has a bending structure, the bending structure is bent toward the second wall when the hook is located in the snapping slot.

Wherein, the snapping slot extends out of the opening, the first wall is disposed adjacent to the opening, the second wall is arranged away from the opening.

Wherein, the accommodating cavity is provided with a linear guiding groove, the battery body is provided with a linear guiding ridge, the linear guiding groove extends along an extending direction of the accommodating cavity, the linear guiding ridge extend along an extending direction of the battery body, the linear guiding ridge slides into the linear guiding groove.

Wherein, an elastic locking member is provided in the accommodating cavity, the elastic locking member is provided in the linear guiding groove, the battery body is provided with a latching eluent, when the hardware male interface is electrically connected to the hardware female interface, the latching element is elastically latched to the elastic locking member.

Wherein, the accommodating cavity has a top surface and a bottom surface disposed opposite to each other, the linear guiding groove is provided the top surface, the linear guiding groove is provided on the bottom surface corresponding to a position of the linear guiding groove on the top surface.

Wherein, a number of the linear guiding grooves is four, and the top surface and the bottom surface are respectively provided with two linear guiding grooves.

Wherein, the guiding groove is shaped as "▣".

Wherein, the accommodating portion has a housing, the accommodating cavity is disposed in the housing.

Wherein, the accommodating portion is provided with a retaining wall, the accommodating cavity is enclosed by the retaining wall.

Wherein, the rotating pair is provided at a center of a side surface of the battery body.

Wherein, the connecting member matches a shape of a half circumference of the battery body.

Wherein, the accommodating cavity is in a shape of an elongated rectangular column, a shape of the battery body matches the shape of the accommodating cavity.

Wherein, the battery body is parallel to ground, when the battery assembly is located in the accommodating cavity, the connecting member extends toward the ground.

The present disclosure further provides a mobile chassis including the battery quick disconnect assembly as described above.

Wherein, the mobile chassis is provided with a battery compartment cover configured to close the battery quick disconnect assembly.

The present disclosure further provides a robot including the battery quick disconnect assembly as described above.

According to the battery quick disconnect assembly, mobile chassis and robot provided by the present disclosure, when the battery assembly is placed in the accommodating cavity, an electrical connection between the battery assembly and the accommodating portion can be realized. The rotating portion can be configured to drive the battery assembly to be quickly separated from the accommodating portion, so that the battery assembly and the accommodating portion can be quickly connected and disconnected.

Details of one or more embodiments of the present disclosure are set forth in the following drawings and descriptions. Other features, objects and advantages of the present disclosure become apparent from the description, drawings and claims.

DETAILED DESCRIPTION OF THE EMBODIMENTS

Hereinafter, preferred embodiments of the present disclosure is described in detail with reference to the accompanying drawings. In the following description, the same reference numerals are assigned to the same members, and repeated descriptions are omitted. In addition, the drawings are only schematic views. The ratios of the dimensions of the members, the shapes of the members may be different from the actual ones.

As shown in FIGS. 1 to 5, the present disclosure relates to a battery quick disconnect assembly 1. The battery quick disconnect assembly 1 can be provided on a mobile chassis of a robot to realize a rapid assembly and disassembly of a battery assembly.

In the present embodiment, the battery quick disconnect assembly 1 includes an accommodating portion 10 and a battery assembly 20. The accommodating portion 10 includes an accommodating cavity 11. A hardware male interface 111 is provided inside the accommodating cavity 11. The accommodating cavity 11 has an opening 112, which is disposed at a proximal end of the accommodating cavity 11, A snapping slot 12 is provided adjacent to the opening 112. The battery assembly 20 includes a battery body 21. The battery body 21 is provided with a hardware female interface 211 and a rotating portion 22. The rotating portion 22 is disposed at a proximal end of the battery body 21. The rotating portion 22 includes two rotating pairs 221, a connecting member 222 connecting the two rotating pairs 221, and hooks 223. Each hook 223 is disposed adjacent to one of the two rotating pairs 221. The two rotating pairs 221 are respectively disposed on both sides of the battery body 21. The battery assembly 20 is detachably placed in the accommodating cavity 11, and when the battery assembly 20 is disposed in the accommodating cavity 11, the hardware female interface 211 is electrically connected to the hardware male interface 111, and the hook 223 is received in the slot 12. When the connecting member 222 is rotated, the hook 223 abuts against an inner wall of the slot 12 and enables the battery assembly 20 to move along a direction of being pulled away from the accommodating cavity 11. In this case, when the battery assembly 20 is placed into the accommodating cavity 11, an electrical connection between the battery assembly 20 and the accommodating portion 10 can be realized. The rotating portion 22 can be configured to drive the battery assembly 20 to be quickly separated from the accommodating portion 10, so that the battery assembly 20 and the accommodating portion 10 can be quickly connected and disconnected.

In some embodiments, the accommodating portion 10 may have a housing, and the accommodating cavity 11 is disposed in the housing.

In some embodiments, the accommodating portion 10 may be provided with a retaining wall, and the accommodating cavity 11 is enclosed by the retaining wall.

Figure 1:
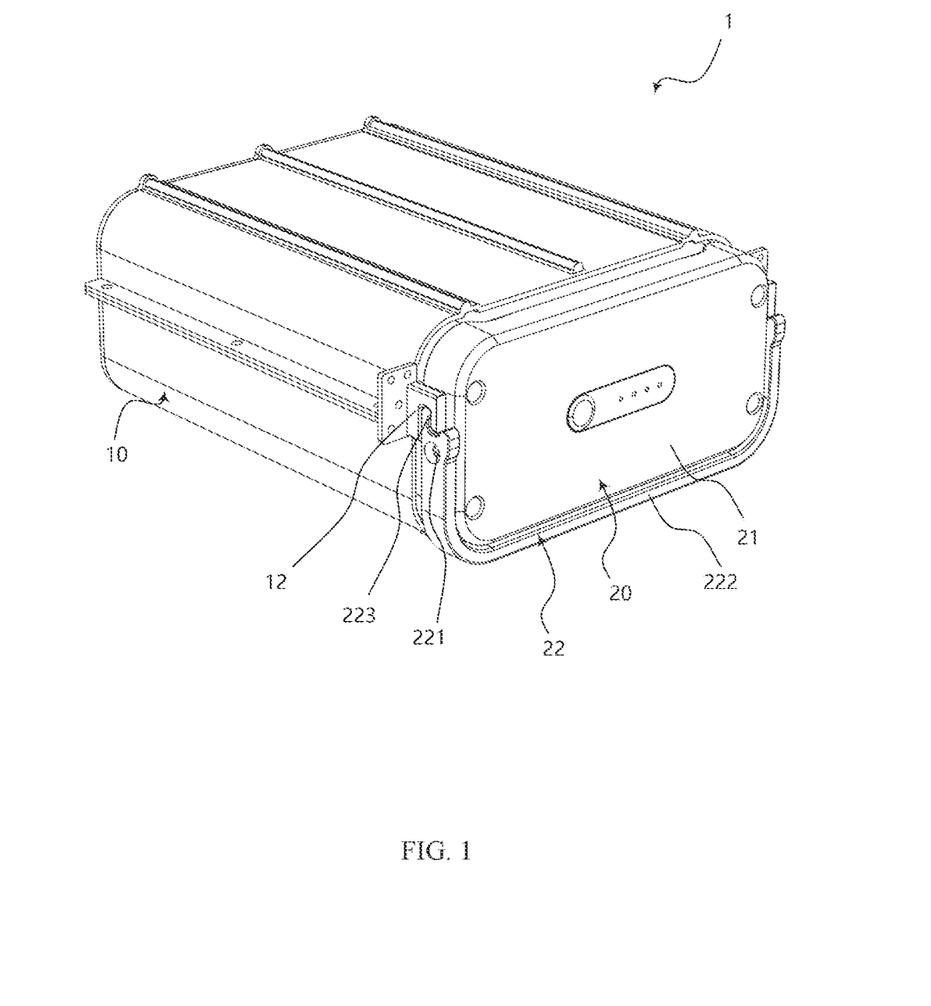
FIG. 1 shows a structural perspective view of a battery quick disconnect assembly according to an embodiment of the present disclosure.
Figure 2:
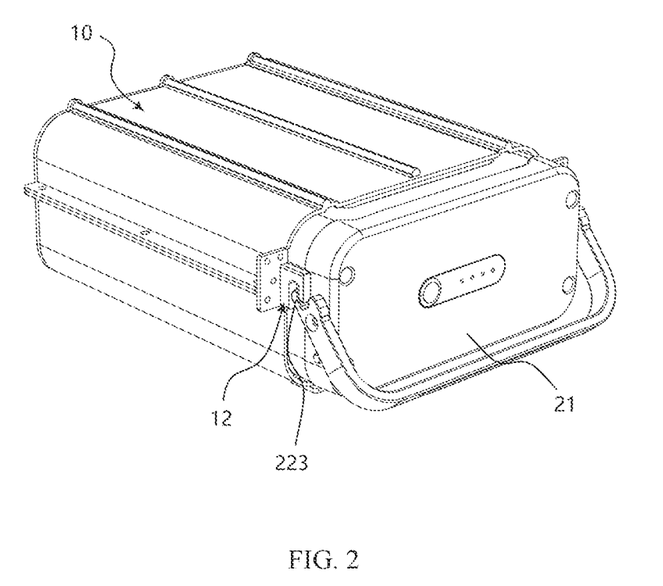
FIG. 2 shows a structural perspective view of a rotating portion of the battery quick disconnect assembly according to an embodiment of the present disclosure.

In the embodiment, the rotating pair 221 may be provided at a center of a side surface of the battery body 21.

In the embodiment, the connecting member 222 may match a shape of a half circumference of the battery body 21. Therefore, it is convenient to accommodate the connecting member 222 around the battery body 21.

In the embodiment, the proximal end of the accommodating cavity 11 may be adjacent to an outer part of the cavity. The proximal end of the battery body 21 may be an end of the batter body 21 disposed in the accommodating cavity 11 and adjacent to the opening 112 of the battery assembly 20.

In the embodiment, the accommodating cavity 11 may be substantially in a shape of an elongated rectangular column. A shape of the battery body 21 may match the shape of the accommodating cavity 11. Thus, it is convenient to load the battery body 21 into the accommodating cavity 11 and take the battery body 21 out of the accommodating cavity 11.

Figure 3:
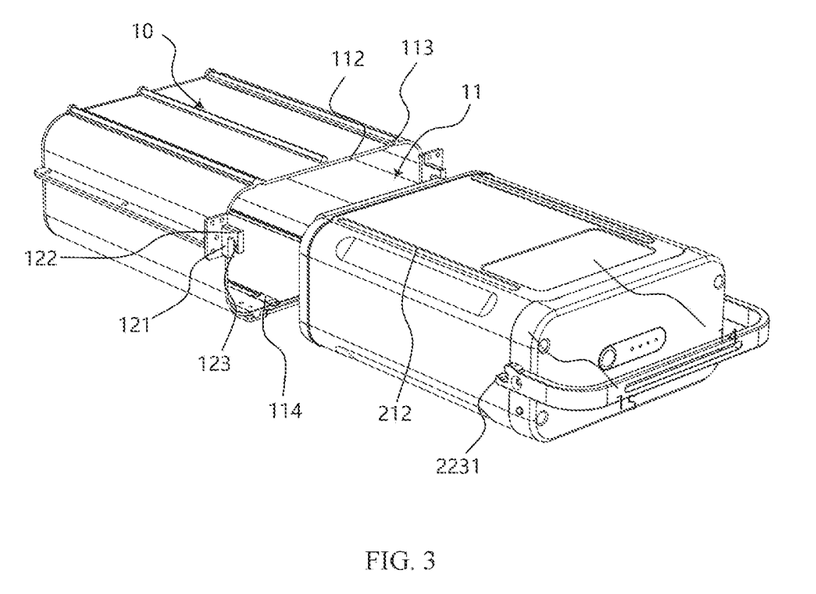
FIG. 3 shows a structural perspective view of the battery quick disconnect assembly in a state of pulling out the battery assembly according to an embodiment of the present disclosure.
Figure 4:
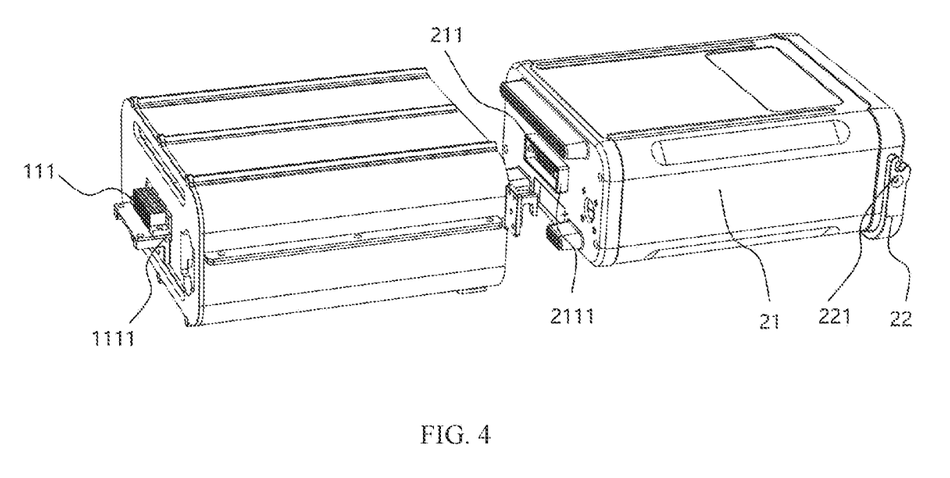
FIG. 4 shows a structural perspective view of another embodiment of the battery quick disconnect assembly in the state of pulling out the battery assembly according to the present disclosure.

In the embodiment, the hardware male interface 111 is disposed at a distal end of the accommodating cavity 11. The hardware female interface 211 is disposed at a distal end of the battery body 21. When the distal end of the battery body 21 abuts against the distal end of the accommodating cavity 11, the battery assembly 20 is located in the accommodating cavity 11, and the hardware male interface 111 is electrically connected to the hardware female interface 211. Therefore, by pushing the battery assembly 20 into the distal end of the accommodating cavity 11, the electrical connection between the hardware male interface 111 and the hardware female interface 211 can be realized.

In the embodiment, a guiding groove 1111 is provided around the hardware male interface 111. A guiding blocking wall 2111 is provided around the hardware female interface 211. The guiding blocking wall 2111 extends into the guiding groove 1111, such that the hardware male interface 111 is electrically connected to the hardware female interface 211. In this case, by providing the guiding groove 1111 and the guiding blocking wall 2111, the hardware female interface 211 and the hardware male interface 111 can be quickly positioned and electrically connected, which improves the convenience of disassembly and assembly of the battery assembly 20.

In some embodiments, the guiding groove 1111 is generally shaped as "  ".

In the embodiment, an inner wall of the snapping slot 12 includes a first wall 121, an arc-shaped wall 122, and a second wall 123. The first wall 121 is parallel to the second wall 123. The arc-shaped wall 122 connects the first wall 121 and the second wall 123. Specifically, the snapping slot 12 may be substantially hook-shaped. The second wall 123 is disposed away from the accommodating cavity 11 relative to the first wall 121. The hook 223 has a bending structure 2231. When the hook 223 is located in the snapping slot 12, the bending structure 2231 is bent toward the second wall 123. Therefore, by rotating the connecting member 222 to enable the bending structure 2231 to abut against the second wall 123, the battery assembly 20 can be pushed into the accommodating cavity 11, By rotating the connecting member 222 reversely to enable the bending structure 2231 to abut against the first wall 121, the battery assembly 20 can be pulled away from the accommodating cavity 11.

In the embodiment, the snapping slot 12 extends out of the opening 112. The first wall 121 is disposed adjacent to the opening 112. The second wall 123 is disposed away from the opening 112.

In the embodiment, the accommodating cavity 11 is provided with linear guiding grooves 113. The battery body 21 is provided with linear guiding ridges 212. The linear guiding groove 113 extends along an extending direction of the accommodating cavity 11. The linear guiding ridge 212 extend along an extending direction of the battery body 21. The linear guiding ridge 212 can slide into the linear guiding groove 113. In this case, it is helpful to mount the battery assembly 20 into the accommodating cavity 11, and accurate alignment can be achieved.

In some embodiments, the accommodating cavity 11 has a top surface and a bottom surface disposed opposite to each other, the linear guiding groove 113 is provided on the top surface, and the linear guiding groove 113 is also provided on a position of the bottom surface corresponding to the top surface.

In some embodiments, four linear guiding grooves 113 may be provided. The accommodating cavity 11 may have the top surface and the bottom surface disposed opposite to each other Two linear guiding grooves 113 may be provided on the top surface, and two linear guiding grooves 113 may be provided on the bottom surface corresponding to the top surface. It should be understood that, positions of the linear guiding ridges 212 may be arranged corresponding to positions of the linear guiding grooves 113.

In the embodiment, an elastic locking member 114 is provided in the accommodating cavity 11. The elastic locking member 114 is provided in the linear guiding groove 113. The battery body 21 is provided with a latching element (not shown). When the hardware male interface 111 is electrically connected to the hardware female interface 211, the latching element is elastically latched to the elastic locking member 114. Thus, after the battery assembly is mounted into the accommodating cavity, it can be latched by the elastic locking member 114 to prevent falling off The configuration of the elastic locking member 114 can facilitate pulling of the battery assembly 20 to separate it from the accommodating cavity 11.

Figure 5:
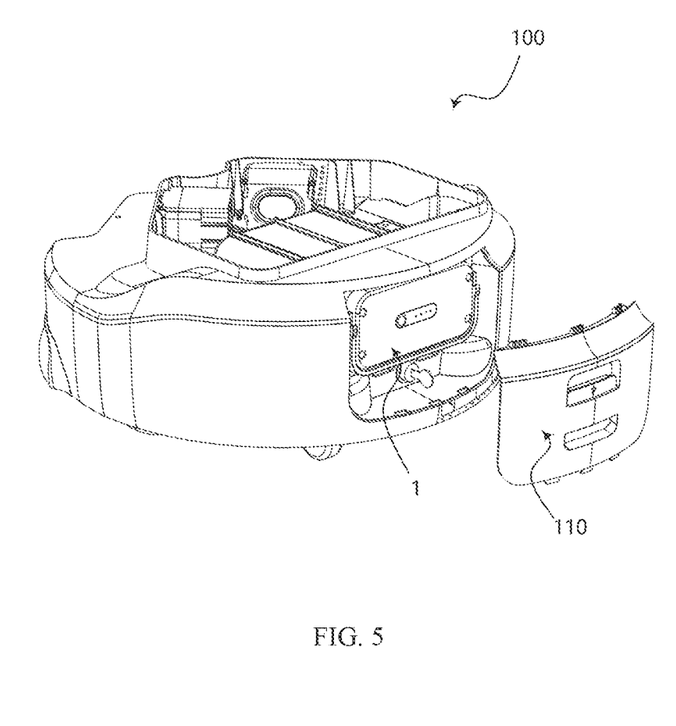
FIG. 5 shows a structural perspective view of a mobile chassis with an opened battery compartment cover according to an embodiment of the present disclosure.

In the embodiment, the present disclosure also relates to a mobile chassis 100, including the aforementioned battery quick disconnect assembly 1. The specific embodiment of the battery quick disconnect assembly 1 will not be repeated herein. In this case, when the battery assembly 20 is placed into the accommodating cavity 11, the electrical connection between the battery assembly 20 and the accommodating portion 10 can be realized. The rotating portion 22 can be configured to drive the battery assembly 20 to be quickly separated from the accommodating portion 10, so that the battery assembly 20 and the accommodating portion 10 can be quickly connected and disconnected.

In some embodiments, the battery body 21 may be configured parallel to ground. When the battery assembly 20 is located in the accommodating cavity 11, the connecting member 222 extends toward the ground.

In some embodiments, the mobile chassis 100 may be provided with a battery compartment cover 110 configured to close the battery quick disconnect assembly 1, The battery compartment cover 110 can openably close the battery quick disconnect assembly 1.

In the embodiment, the present disclosure also relates to a robot (not shown), including the aforementioned battery quick disconnect assembly 1, and the specific embodiment of the battery quick disconnect assembly will not be repeated herein. In this case, when the battery assembly 20 is placed into the accommodating cavity 11, the electrical connection between the battery assembly 20 and the accommodating portion 10 can be realized. The rotating portion 22 can be configured to drive the battery assembly 20 to be quickly separated from the accommodating portion 10, so that the battery assembly; 20 and the accommodating portion 10 can be quickly connected and disconnected.

In some embodiments, the battery body 21 may be configured parallel to the ground. When the battery assembly 20 is located in the accommodating cavity 11, the connecting member 222 extends toward the ground. Therefore, the battery body 21 is placed horizontally and the method of dragging the connecting member is adopted, so that the separation of the battery assembly 20 from the accommodating portion 10 is easier and more convenient.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

What is claimed is:

1. A battery quick disconnect assembly, comprising:
an accommodating portion comprising an accommodating cavity, wherein a hardware male interface is provided inside the accommodating cavity, the accommodating cavity has an opening provided at a proximal end of the accommodating cavity, a snapping slot is provided adjacent to the opening; and
a battery assembly comprising a battery body, wherein the battery body is provided with a hardware female interface and a rotating portion, the rotating portion is disposed at a proximal end of the battery body, the rotating portion includes two rotating pairs, a connecting member connecting the two rotating pairs, and hooks, each hook is disposed adjacent to one of the two rotating pairs, the two rotating pairs are respectively disposed on both sides of the battery body;

wherein the battery assembly is detachably placed in the accommodating cavity, and when the battery assembly is disposed in the accommodating cavity, the hardware female interface is electrically connected to the hardware male interface, the hook is received in the slot, when the connecting member is rotated, the hook abuts against an inner wall of the slot and enables the battery assembly to move along a direction away from the accommodating cavity;

wherein an inner wall of the snapping slot includes a first wall, an arc-shaped wall, and a second wall, the first wall is parallel to the second wall, the arc-shaped wall connects to the first wall and the second wall, the second wall is disposed away from the accommodating cavity relative to the first wall, the hook has a bending structure, the bending structure is bent toward the second wall when the hook is located in the snapping slot; and wherein the snapping slot extends out of the opening, the first wall is disposed adjacent to the opening, the second wall is arranged away from the opening.

2. The battery quick disconnect assembly of claim 1, wherein the hardware male interface is disposed at a distal end of the accommodating cavity, the hardware female interface is disposed at a distal end of the battery body, when the distal end of the battery body abuts against the distal end of the accommodating cavity, the battery assembly is located in the accommodating cavity, and the hardware male interface is electrically connected to the hardware female interface.

3. The battery quick disconnect assembly of claim 2, wherein a guiding groove is provided around the hardware male interface, a guiding blocking wall is provided around the hardware female interface, the guiding blocking wall extends into the guiding groove, so as to electrically connect the hardware male interface to the hardware female interface.

4. The battery quick disconnect assembly of claim 1, wherein the accommodating cavity is provided with a linear guiding groove, the battery body is provided with a linear guiding ridge, the linear guiding groove extends along an extending direction of the accommodating cavity, the linear guiding ridge extends along an extending direction of the battery body, the linear guiding ridge slides into the linear guiding groove.

5. The battery quick disconnect assembly of claim 4, wherein the accommodating cavity has a top surface and a bottom surface disposed opposite to each other, the linear guiding groove is provided on the top surface, the linear guiding groove is provided on the bottom surface corresponding to a position of the linear guiding groove on the top surface.

6. The battery quick release assembly of claim 5, wherein a number of the linear guiding grooves is four, and the top surface and the bottom surface are respectively provided with two linear guiding grooves.

7. The battery quick disconnect assembly of claim 1, wherein the accommodating portion has a housing, the accommodating cavity is disposed in the housing.

8. The battery quick disconnect assembly of claim 1, wherein the accommodating portion is provided with a retaining wall, the accommodating cavity is enclosed by the retaining wall.

9. The battery quick disconnect assembly of claim 1, wherein the rotating pair is provided at a center of a side surface of the battery body.

10. The battery quick release assembly of claim 1, wherein the connecting member matches a shape of a half circumference of the battery body.

11. The battery quick disconnect assembly of claim 1, wherein the accommodating cavity is in a shape of an elongated rectangular column, a shape of the battery body matches the shape of the accommodating cavity.

12. The battery quick disconnect assembly of claim 1, wherein the battery body is parallel to ground, when the battery assembly is located in the accommodating cavity, the connecting member extends toward the ground.

13. A mobile chassis comprising the battery quick disconnect assembly according to claim 1.

14. The mobile chassis of claim 13, wherein the mobile chassis is provided with a battery compartment cover configured to close the battery quick disconnect assembly.

15. A robot comprising the battery quick disconnect assembly according to claim 1.

16. A battery quick disconnect assembly, comprising:
an accommodating portion comprising an accommodating cavity, wherein a hardware male interface is provided inside the accommodating cavity, the accommodating cavity has an opening provided at a proximal end of the accommodating cavity, a snapping slot is provided adjacent to the opening; and
a battery assembly comprising a battery body, wherein the battery body is provided with a hardware female interface and a rotating portion, the rotating portion is disposed at a proximal end of the battery body, the rotating portion includes two rotating pairs, a connecting member connecting the two rotating pairs, and hooks, each hook is disposed adjacent to one of the two rotating pairs, the two rotating pairs are respectively disposed on both sides of the battery body;
wherein the battery assembly is detachably placed in the accommodating cavity, and when the battery assembly is disposed in the accommodating cavity, the hardware female interface is electrically connected to the hardware male interface, the hook is received in the slot, when the connecting member is rotated, the hook abuts against an inner wall of the slot and enables the battery assembly to move along a direction away from the accommodating cavity;
wherein the accommodating cavity is provided with a linear guiding groove, the battery body is provided with a linear guiding ridge, the linear guiding groove extends along an extending direction of the accommodating cavity, the linear guiding ridge extends along an extending direction of the battery body, the linear guiding ridge slides into the linear guiding groove; and
wherein an elastic locking member is provided in the accommodating cavity, the elastic locking member is provided in the linear guiding groove, the battery body is provided with a latching element, when the hardware male interface is electrically connected to the hardware female interface, the latching element is elastically latched to the elastic locking member.

* * * * *